(12) United States Patent
Ehlinger et al.

(10) Patent No.: US 7,369,538 B1
(45) Date of Patent: May 6, 2008

(54) METHOD AND APPARATUS FOR IMPLEMENTING A HIGH-RELIABILITY LOAD BALANCED EASILY UPGRADEABLE PACKET TECHNOLOGY

(75) Inventors: James C. Ehlinger, Colts Neck, NJ (US); Christopher P. Gilboy, Freehold, NJ (US); Marius J. Gudelis, Holmdel, NJ (US)

(73) Assignee: AT&T Corp., New York, NY (US)

( * ) Notice: Subject to any disclaimer, the term of this patent is extended or adjusted under 35 U.S.C. 154(b) by 908 days.

(21) Appl. No.: 10/328,357

(22) Filed: Dec. 23, 2002

(51) Int. Cl.
*H04L 12/66* (2006.01)
(52) U.S. Cl. .................. 370/352; 379/90.01
(58) Field of Classification Search ........... 370/352, 370/400, 401; 379/90.01
See application file for complete search history.

(56) References Cited

U.S. PATENT DOCUMENTS

| | | | |
|---|---|---|---|
| 5,905,959 A | 5/1999 | Foladare et al. | |
| 5,918,179 A | 6/1999 | Foladare et al. | |
| 6,014,549 A | 1/2000 | Foladare et al. | |
| 6,032,023 A | 2/2000 | Foladare et al. | |
| 6,070,054 A | 5/2000 | Foladare et al. | |
| 6,625,141 B1* | 9/2003 | Glitho et al. | 370/352 |
| 6,970,471 B1* | 11/2005 | Yeh et al. | 370/352 |

OTHER PUBLICATIONS

U.S. Appl. No. 10/026,582, filed Dec. 19, 2001, Method of Providing Intelligent Communication Features for Calls in a Communications Network for a Remote Worker Using a Virtual Communication Service.

* cited by examiner

Primary Examiner—Stella Woo (57) ABSTRACT

A network is defined with several alternative softswitches/proxies, which may be used for communication. Each softswitch/proxy has a unique Internet Protocol (IP) address. The softswitches/proxies receive configuration data from a centralized user-profile server, which maintains user-profile information. A centralized call-detail record (CDR) server also is connected to each softswitch/proxy and maintains CDRs on each user on each softswitch/proxy. Based on the network configuration, an end-device configuration system generates a provisioning file. The provisioning file includes the IP addresses of each softswitch/proxy. The provisioning file is communicated to user devices. Each user device accesses the provisioning file and uses the IP address for communication. Should the communication fail for any reason, the user device may autonomously access the provisioning file and initiate another call using the next IP address in the provisioning file. This process may continue until a call is completed.

13 Claims, 4 Drawing Sheets

METHOD AND APPARATUS FOR IMPLEMENTING A HIGH-RELIABILITY LOAD BALANCED EASILY UPGRADEABLE PACKET TECHNOLOGY

BACKGROUND OF THE INVENTION

1. Field of the Invention

This invention relates to communication networks. Specifically, the present invention relates to the architecture and operation of communication networks.

2. Description of the Prior Art

Modern voice communication networks are implemented with circuit-switched technology, packet-switched technology and wireless technology. Circuit-switched technology is the more conventional telephone technology in which a single path (i.e., circuit) is maintained between two communicating users. In packet-switched technology, packets take different paths between two communicating users. In wireless technology, air is used as the communication medium.

While each of these technologies may be implemented separately, in modern networks, these technologies are often integrated to enable end-to-end communications. For example, a user may use a conventional telephone connected to a circuit-switched technology to initiate a telephone call. The telephone call may initially traverse a conventional telephone network, such as the Public Switched Telephone Network (PSTN), and then crossover into a packet-switched network, such as an Internet protocol based network (i.e., Voice-Over-IP). In addition, each of these networks, the circuit-switched network and the packet-switched network, may provide the starting point for communication over a wireless network.

Circuit-switched networks have become a very stable technology. The foundational component of a circuit-switched network is the circuit switch. In a conventional circuit-switched network, the circuit switch and processors within the circuit switch are designed to be highly reliable. For example, software is written to manage failures in the circuit switch or congestion in the network. In addition, if there is a problem with the primary circuit switch, software techniques and procedures are implemented to transition to a backup circuit switch.

However, providing a stable circuit-switched network is expensive and complicated. Since the circuit switch is "wired" to a customer, it presents a single point of failure. In addition, the switch capacity is typically over engineered to avoid congestion, blocking or load-balancing problems in the network. Over engineering the network adds to the cost of providing service. Furthermore, if there is a disaster at the location that houses the circuit switch, service is disrupted and it is often very difficult to quickly restore service. Therefore, to provide a highly reliable solution, the locations that house these switches need to support backup power, diverse facility routes, etc. All of these issues add to the complexity and expense of the network.

In addition, maintenance of the circuit switch, such as software upgrades, has to be carefully implemented so that customers do not experience a disruption of service. The maintenance process typically consists of sequentially upgrading different parts of the network (i.e., switch-by-switch or processor-by-processor upgrade). Therefore, maintenance is typically performed at night, which also adds to the cost and complexity of operation.

As voice communications transition to packet networks, users will require the same reliability in packet networks as in the circuit-switched networks. Initially, the same approach was taken in packet-switched networks as in circuit-switched networks. Incredibly robust packet switches were implemented using robust processors so that should a failure occur, the failure could be managed. Many of these robust features were implemented using very complex, proprietary software algorithms and over-engineered hardware components.

As more commercial hardware and software became available, the robustness of the network was achieved by implementing redundant processors or redundant switches. For example, modern packet-switched networks are implemented using two softswitches (i.e., servers) each configured in a similar manner. The servers exchange status messages between each other. The status messages are referred to as a heartbeat. During configuration, one server is designated as the primary and a second server is designated as the secondary (i.e., backup). As such, should the primary fail, communications can be transitioned over to the secondary and the secondary would continue the communications. The two servers/processors are given a single Internet protocol address. Therefore, to the rest of the network, the two servers appear as one server. Proprietary software then controls the identification of a failure and the transition of a call during the failure. The proprietary software is located in each softswitch to detect the failure of the mated pair (i.e., partner exchanging heartbeat) and then take over call processing, if necessary. The mated pair typically must reside in the same physical location. In addition, power backup and a highly reliable data network is required for interconnection. Thus, additional costs are required to provide a reliable environment/solution for a two-server design implementing a heartbeat.

In addition to failures, maintenance needs to be carefully managed in a two-server (i.e., two-processor) design implementing a heartbeat. For example, when performing maintenance, the two processors must be synchronized. As a result, complex algorithms need to be implemented to make sure that the two processors are both upgraded in a synchronized manner. In addition, the maintenance or upgrades need to be performed so that service to users is not disrupted.

There are a number of shortcomings with the two-server (i.e., two-processor) design. For example, detecting a failure is often problematic and since the transition to the second processor occurs when there is a failure of the first processor, the system may not transition because of an inability to detect a failure of the first processor. In addition, there are a number of reasons why a processor may not respond to the heartbeat. For example, the processor may not receive the incoming call messages, the processor itself may fail, etc. Thus, it is often difficult to identify and isolate the fault and, therefore, troubleshoot or initiate the transition to the second processor.

Once a problem is detected, the current calls need to be transitioned to the second processor. Transition of the calls to the second processor requires complex software algorithms so that the calls are not dropped. Typically, when there is a failure between two processors using the heartbeat, the call transition is accomplished by determining that the first processor is no longer available to handle the call. Communications then have to occur between the first and second processor to transition the call to the second processor. The call is then continued on the second processor. All of these steps need to occur during the call. As a result, the process of transitioning and continuing a call is very difficult when using redundant processors communicating with a heartbeat.

Thus, there is a need for a method and apparatus that provides redundancy in packet networks. There is a need for a method and apparatus that performs load balancing in packet networks. There is a need for implementing robust packet-switching networks that can easily switch calls, are easily upgradeable, and easily reconfigured.

SUMMARY OF THE INVENTION

The present invention increases the reliability of a voice network by introducing a new network configuration and providing agent software to provide intelligence in user devices. The present invention also reduces the design and maintenance complexity of packet-telephone networks, thus, reducing equipment and operations costs.

In one embodiment of the present invention, a network comprises a user-profile server that stores user-profile information. The user-profile information may be any information that defines the user or their services. For example, the user-profile information may include user address information, contact information, etc. In addition, the user-profile information may include information on the user calling plan, such as whether the user has call waiting, call forwarding, etc.

A network implementing the method and apparatus of the present invention includes a number of softswitches in communication with the user-profile server. As such, the user-profile information is communicated from the user-profile server to the softswitches in the network. In one embodiment of the present invention, each softswitch includes the same configuration information.

The softswitches in communication with the user-profile server include a first softswitch including a first Internet Protocol (IP) address and storing first configuration data in response to the user-profile information stored in the user-profile server. The first softswitch is the primary softswitch. The first IP address is the IP address of the first softswitch. As such, communication with the first softswitch is accomplished by directing packets to the first IP address. The first configuration information defines the first softswitch as a recipient of a user's communications and defines the services that the user may access using the first softswitch.

The softswitches in communication with the user-profile server include a second softswitch including a second IP address and storing the first configuration information in response to the user-profile information stored in the user-profile server. The second softswitch is a backup softswitch used in the event that the first softswitch is unavailable for any reason. The second softswitch is designated with a second IP address, which is different from the first IP address. A user may send communication directly to the second softswitch without any negotiation correspondence or dependence on the first softswitch. As a result, the first softswitch and the second softswitch each function independently of each other. Both the first softswitch and the second softswitch are configured in the same way. Therefore, the second softswitch stores the same configuration information (i.e., first configuration information) as the first softswitch.

A call-detail server is in communication with the first softswitch and in communication with the second softswitch. The call-detail server is configured with call-detail information in response to the first configuration information stored in the first softswitch and in response to the first configuration information stored in the second softswitch. For example, the call-detail server is configured with a call-detail record for each user on each softswitch. Therefore, the call-detail server may include a single call-detail record for each user or the call-detail server may include an instantiation of a call-detail record for each time the user appears on a softswitch. For example, if there are three servers, each configured to support a specific user (i.e., primary softswitch, secondary softswitch, tertiary softswitch), then three call-detail records may be maintained for the user.

A configuration system is in communication with the first softswitch and in communication with the second softswitch. The configuration system provisions the network for the users by identifying which softswitch is the primary softswitch, secondary softswitch, etc. The configuration system provisions the network by using a provisioning (i.e., configuration) file including the first IP address, the second IP address, etc. The configuration system assesses the network and determines the paths, routes, etc. required to access the first softswitch, second softswitch, etc. The IP addresses associated with the softswitches are then stored in a provisioning file and communicated to a user device.

A user device is in communication with the configuration system, the first softswitch and the second softswitch. The user device is an IP-ready device or a traditional telephone connected to an IP-ready device. A provisioning file is communicated from the configuration system to each user device. The provisioning file includes a primary IP address and a secondary IP address. The user device makes a call to the first softswitch by using the primary IP address included in the provisioning file. If the call is disrupted or does not get through for any reason, after a predefined time, the user device initiates a call to the second softswitch. The user device may perform this process during call initiation or the user device may perform this process if the call is interrupted for any reason and the call needs to be transitioned to the second softswitch.

In one embodiment of the present invention, a network comprises a user-profile server storing user-profile information; a first softswitch including a first IP address is in communication with the user-profile server and stores first configuration data in response to the user-profile information stored in the user-profile server; a second softswitch including a second IP address is in communication with the user-profile server and stores the first configuration data in response to the user-profile information stored in the user-profile server; a call-detail server is in communication with the first softswitch and in communication with the second softswitch, the call-detail server is configured with call-detail information in response to the first configuration information stored in the first softswitch and in response to the first configuration information stored in the second softswitch; and a configuration system is in communication with the first softswitch and in communication with the second softswitch, the configuration system provisioning the network and generating a provisioning file including the first IP address and the second IP address. In addition, the network further comprises a user device in communication with the configuration system and capable of generating a call in response to the first IP address and in response to the second IP address included in the provisioning file and generated by the configuration system.

A network comprises a user-profile server storing user-profile information; a plurality of softswitches, each including an IP address associated therewith and each in communication with the user-profile server and storing configuration data in response to the user-profile information stored in the user-profile server; a call-detail server is in communication with each of the plurality of softswitches, the call-detail server stores call-detail information in response to each of the plurality of softswitches; and a configuration system is in communication with each of the plurality of softswitches, the configuration system provisioning the network by using a configuration file including the IP address associated with each of the plurality of softswitches. The network further comprises a user device in communication with the configuration system and capable of generating a call in response to the IP address associated with each of the plurality of softswitches included in the configuration file.

A user device comprises an interface receiving a configuration file, the configuration file including a first IP address and a second IP address; a first memory storing computer instructions; a second memory storing the configuration file including the first IP address and the second IP address; and a processor coupled to the first memory and coupled to the second memory, the computer instructions causing the processor to generate a call request to the first IP address and after a predefined time causing the processor to generate a call request to the second IP address.

A product comprises a computer usable medium storing computer instructions and a configuration file including a first IP address and a second IP address; the computer instructions causing the computer to generate a first call connection in response to the first IP address included in the configuration file; test the first call connection; and if the first call connection fails, generate a second call connection in response to the second IP address included in the configuration file and in response to testing the first call connection.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In one embodiment of the present invention, a softswitch or proxy communicates with user devices, such as a Media Terminal Adaptor (MTA), IP phone, or Public Service Telephone Network (PSTN) gateway to provide local dial tone and features, such as caller ID and call waiting for users. For example, in one embodiment of the present invention, the PSTN gateway would be a user device and would be used for calls that originate or terminate on the Public Switched Telephone Network (PSTN).

User-profile information is stored and maintained in a centralized user-profile server and dynamically downloaded to several softswitches/proxies whenever the softswitches/proxies boot up or when the network configuration changes. Once the softswitches have been configured, a provisioning file is constructed in an end-device configuration system.

The end-device configuration system dynamically provides the user devices with the IP addresses of a primary and alternate softswitch/proxy for communication.

The IP addresses are downloaded from the end-device configuration system and stored in a provisioning file in the user device. The softswitches/proxies send call event information to a centralized Call Detail Recording (CDR) system so that all of the users' calls can be properly accounted for regardless of which softswitch/proxy handles the call. The call-event information may include any information used for billing, traffic engineering, or other administrative functions.

Using the IP addresses in the provisioning file, the user device has two (or more) softswitches/proxies that the user device can use for communication. As a result, if the primary softswitch is unavailable for any reason, the user device will use the IP address of the alternate (i.e., second) softswitch/proxy for communication. By storing and using multiple IP addresses, the user device is able to switch between the primary and alternate softswitches/proxies.

During operation, when the user device attempts to make a call, if the primary softswitch/proxy is unavailable, after a predefined time, the user device will send call control signaling to the secondary softswitch/proxy (i.e., using the second IP address in the provisioning file). Also, if the softswitch is in an overload condition, the softswitch can simply ignore new call requests, causing the IP phone to request call setup using the secondary softswitch/proxy. As a result, load balancing is also achieved using the method and apparatus of the present invention.

In one embodiment of the present invention, load balancing may be implemented by engineering the softswitch/proxy to ignore new call requests when the system utilization reaches a threshold. For example, in the case of a two softswitch/proxy solution, if each softswitch/proxy is engineered to support 50% of the forecasted maximum load and the overload threshold is set to 60% of maximum capacity (leaving a 10% buffer), then if one of the softswitches/proxies is at 60% of capacity simply by ignoring new call requests, the new call requests will be supported by the other softswitch/proxy.

The method and apparatus of the present invention also simplifies the maintenance of the softswitch/proxy equipment. Since the user device is configured to "find" an available softswitch/proxy, maintenance staff can simply take one of the softswitches/proxies out-of-service, perform maintenance, and then restore the softswitch/proxy back to service without any interruption of service to the user device. If maintenance is performed on the primary softswitch/proxy, the user device will access the secondary IP address and switch to the alternate softswitch/proxy. If the alternate softswitch/proxy is taken offline, the user device will continue communication with the primary softswitch/proxy.

Figure 1:
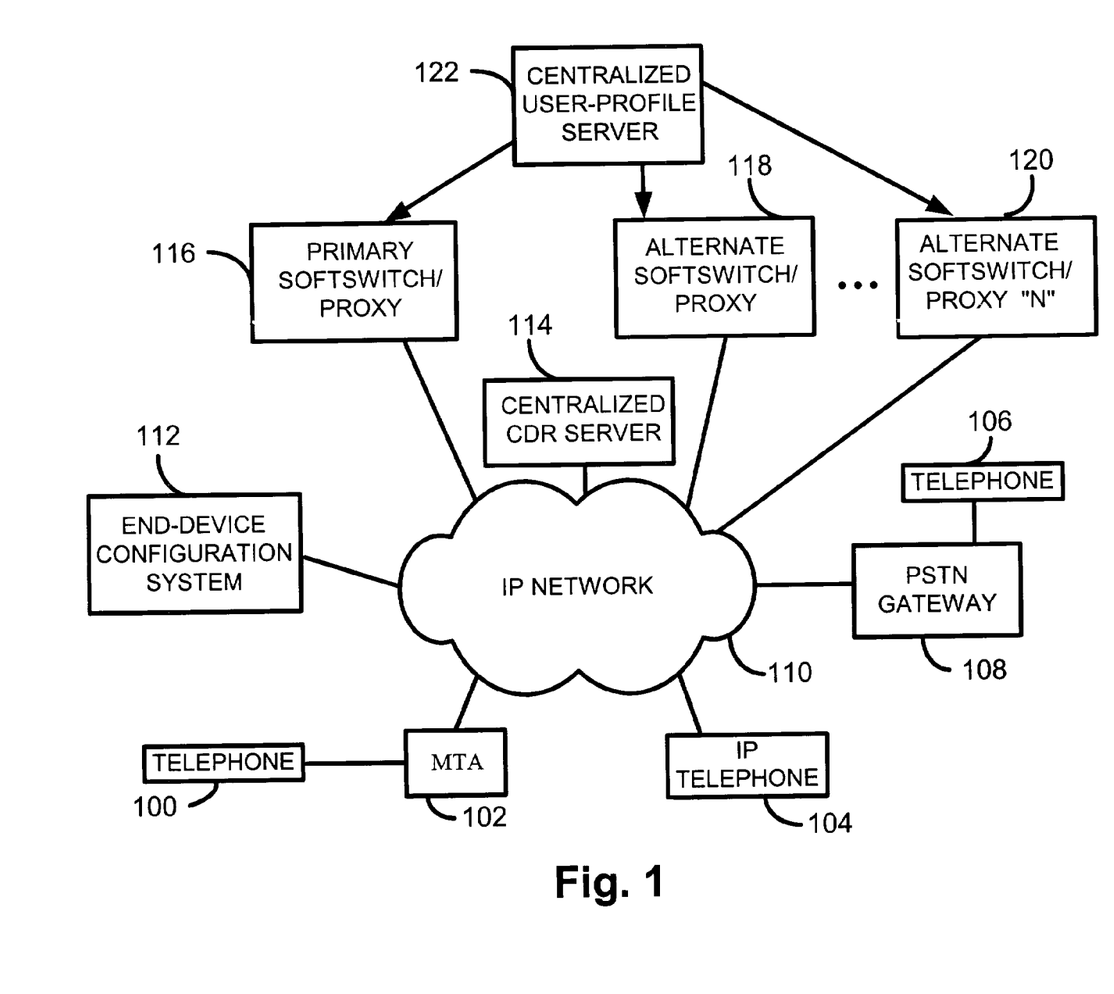
FIG. 1 displays a diagram of a network implementing the method and apparatus of the present invention.

FIG. 1 displays a communication network implementing the method and apparatus of the present invention. In FIG. 1, a number of user devices are shown. A telephone is shown as 100. The telephone 100 is connected to a Media Terminal Adaptor (MTA) 102. The MTA 102 converts analog-voice signals coming from the telephone 100 into Internet packets for communications over the IP network 110.

The user device may be implemented as an Internet Protocol (IP) telephone 104. The IP telephone 104 may be any kind of Internet-ready appliance for receiving voice information and converting the voice information into IP-compliant information, such as IP packets. For example, the IP telephone 104 may include a conventional telephone with Internet software and Internet-compliant interfaces. The IP telephone 104 may include a Personal Data Assistant (PDA) capable of receiving voice and communicating voice over the Internet (i.e., wireless or connected PDA). Lastly, the IP telephone 104 may include a multi-function computer running telephone software and including an interface connected to the IP network 110.

A telephone is shown as 106. The telephone 106 may connect to the IP network 110 through a PSTN gateway 108. The PSTN gateway 108 may be considered a user device or the PSTN gateway 108 in combination with the telephone 106 may be considered a user device. The telephone 106 receives analog-voice information and communicates the analog-voice information to the PSTN gateway 108 where the analog-voice information is converted to IP-compliant communications for transmission over the IP network 110. In one embodiment of the present invention, the PSTN gateway 108 may be implemented with a traditional circuit-switched technology. In another embodiment of the present invention, the PSTN gateway 108 may be implemented with a packet-switched technology, such as softswitch technology.

Various network components are connected to the IP network 110. An end-device configuration system 112 is shown. The end-device configuration system 112 provisions Internet addresses and communicates those addresses to the MTA 102, the IP telephone 104, and the PSTN gateway 108. The end-device configuration system 112 may be implemented with a multi-function computer or the end-device configuration system 112 may be implemented with specialized hardware. In one embodiments of the present invention, the end-device configuration system 112 includes a plurality of Internet interfaces for receiving IP configuration information from softswitches in the network and communicating provisioning files to the MTA 102, the IP telephone 104, or the PSTN gateway 108.

In another embodiment of the present invention, the end-device configuration system 112 includes a database storing provisioning information. The provisioning information includes any information required to perform provisioning in the network. For example, the provisioning information may include the relationships between IP addresses and softswitches. The provisioning information may correlate routes, IP addresses, softswitches and users. The end-device configuration system 112 communicates the provisioning information across the IP network 110 to the MTA 102, the IP telephone 104, or the PSTN gateway 108. The provisioning information may be communicated as a file, which is used by the user devices to provision traffic across the IP network 110. As such, the configuration file including the IP addresses may be considered a provisioning file.

The end-device configuration system 112 implements an algorithm, which acquires (i.e., polls and receives or automatically receives) IP addresses from various softswitches in the network. The algorithm may then perform correlation and provisioning functions, such as designing routing patterns etc. The end-device configuration system 112 then provides those IP addresses in the form of a provisioning file to user devices within the network.

Several softswitches are shown. For example, a primary softswitch/proxy is shown as 116, an alternate softswitch/proxy is shown as 118, and an alternate softswitch/proxy "N" is shown as 120. In one embodiment of the present invention, each softswitch/proxy is fully loaded and configured with information (i.e., configuration information, such as routing data and algorithms) required to switch calls. Each softswitch/proxy may be implemented with specialized hardware, software, or each softswitch/proxy may be implemented in a multi-function computer under the control of computer instructions, which direct the multi-function computer to switch calls.

A centralized call-detailed record (CDR) server is shown as 114. The centralized CDR server 114 stores CDRs and records call activity for each user on each softswitch/proxy in the network. For example, the CDR may include any type of maintenance information including billing, usage statistics, etc. The centralized CDR server 114 is configured such that as calls are made from any softswitch/proxy in the network, the CDR in the centralized CDR server 114 will be updated and maintained. The centralized CDR server 114 may be implemented with specialized hardware or the centralized CDR server 114 may be implemented with a multi-function computer running under the control of computer instructions. In addition, the CDRs may be stored in a database, such as a relational database, which is accessed by a processor in the multi-function computer.

A centralized user-profile server is shown as 122. The centralize user-profile server 122 is connected to each softswitch/proxy in the network. The centralized user-profile server 122 maintains user-profile information. For example, the centralized user-profile server 122 maintains information on the users' calling plan features, such as call waiting, three-way calling, etc. The centralized user-profile server 122 may be implemented in specialized hardware or may be implemented in a multi-function computer under the direction of computer instructions. The computer instructions direct the centralized user-profile server 122 to communicate user-profile information to each softswitch/proxy in the network.

Figure 2:
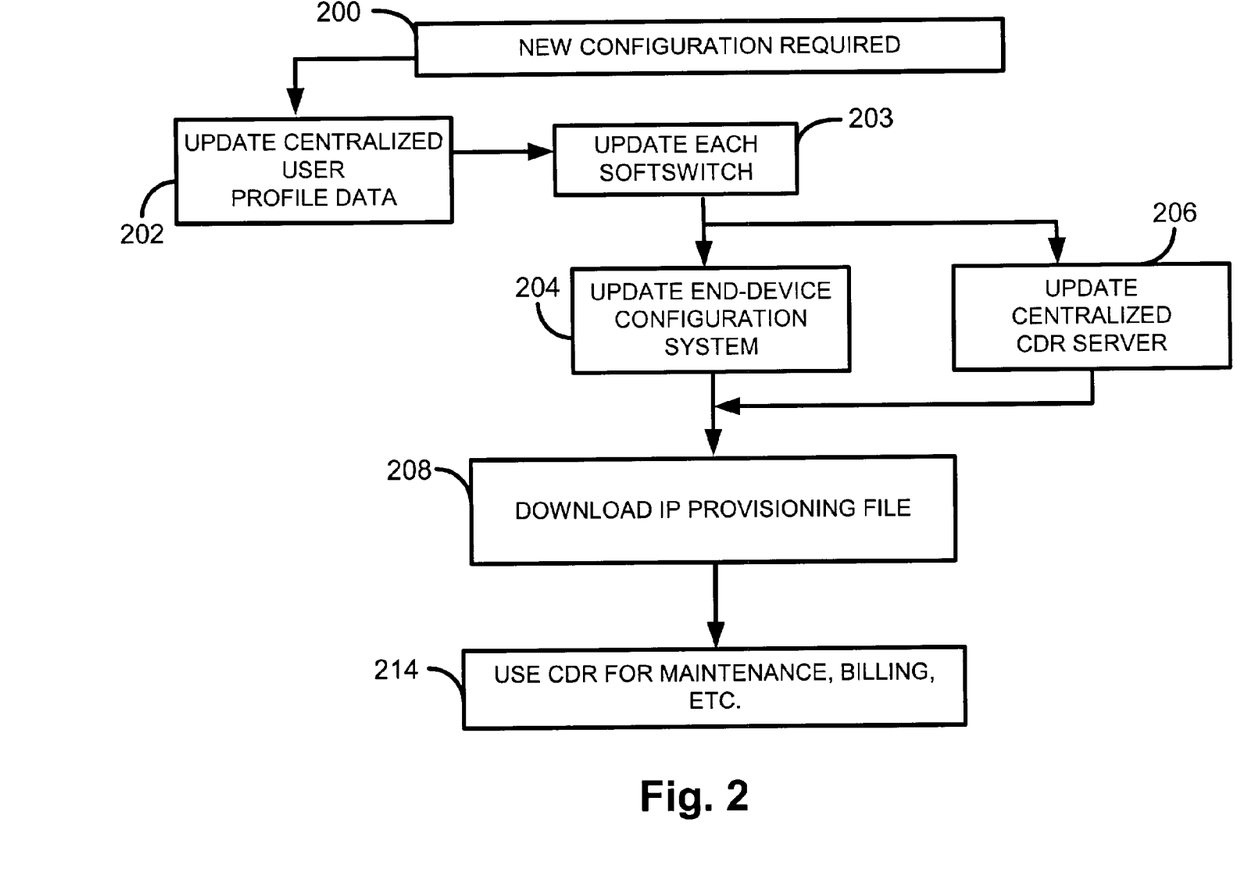
FIG. 2 displays a flow diagram implementing a network method of the present invention.

A method of operating the network shown in FIG. 1 is disclosed by the flowchart shown in FIG. 2. The method of FIG. 2 will be discussed in conjunction with the network displayed in FIG. 1. The method of operating the network may be implemented in real-time, in non-real time, or at predefined times. At 200, new configuration is required. The new configuration may be required for a variety of reasons. For example, when a new telephone or user joins the network, new configuration information maybe required. When a user changes their profile or services, new configuration information maybe required. Lastly, when there are any changes in the network, whether these are changes to the softswitches, changes to the end-device configuration system 112, changes to the centralized call-detail record (CDR) server 114, or changes to the centralized user-profile server 122, new configuration may be required.

When new configuration information is required, a number of different components in the network are updated. The components may be updated simultaneously, sequentially, or the components may be updated using an algorithm. The centralized user-profile data is updated as shown at 202. Each softswitch/proxy in the network is updated as shown at 203. Each softswitch may be updated simultaneously, sequentially, or consistent with an algorithm. Once each softswitch/proxy has been updated, the end-device configuration system 112 is updated as shown at 204 and the centralized CDR server 114 is updated as shown at 206. The end-device configuration system 112 is updated with the IP address of all softswitches/proxies that are capable of switching calls. The centralized CDR server 114 is updated to include records for each softswitch/proxy that is active in the network and capable of switching calls.

As shown at 208, a provisioning file (i.e., configuration file) is downloaded from the end-device configuration system 112 of FIG. 1 across the IP network 110 to a user device, such as the MTA 102, IP telephone 104, or PSTN gateway

108. The provisioning file includes the IP addresses of each softswitch/proxy in the network that may be used by the MTA 102, IP telephone 104, and the PSTN gateway 108 to complete calls. For example, the provisioning file includes the IP address of the primary softswitch/proxy 116 of FIG. 1, the alternate softswitch/proxy 118 of FIG. 1, and the alternate softswitch/proxy "N" 120 of FIG. 1. Lastly, the CDRs stored in the centralized CDR server 114 of FIG. 1 are updated so that maintenance and billing can be conducted as shown at 214.

Figure 3:
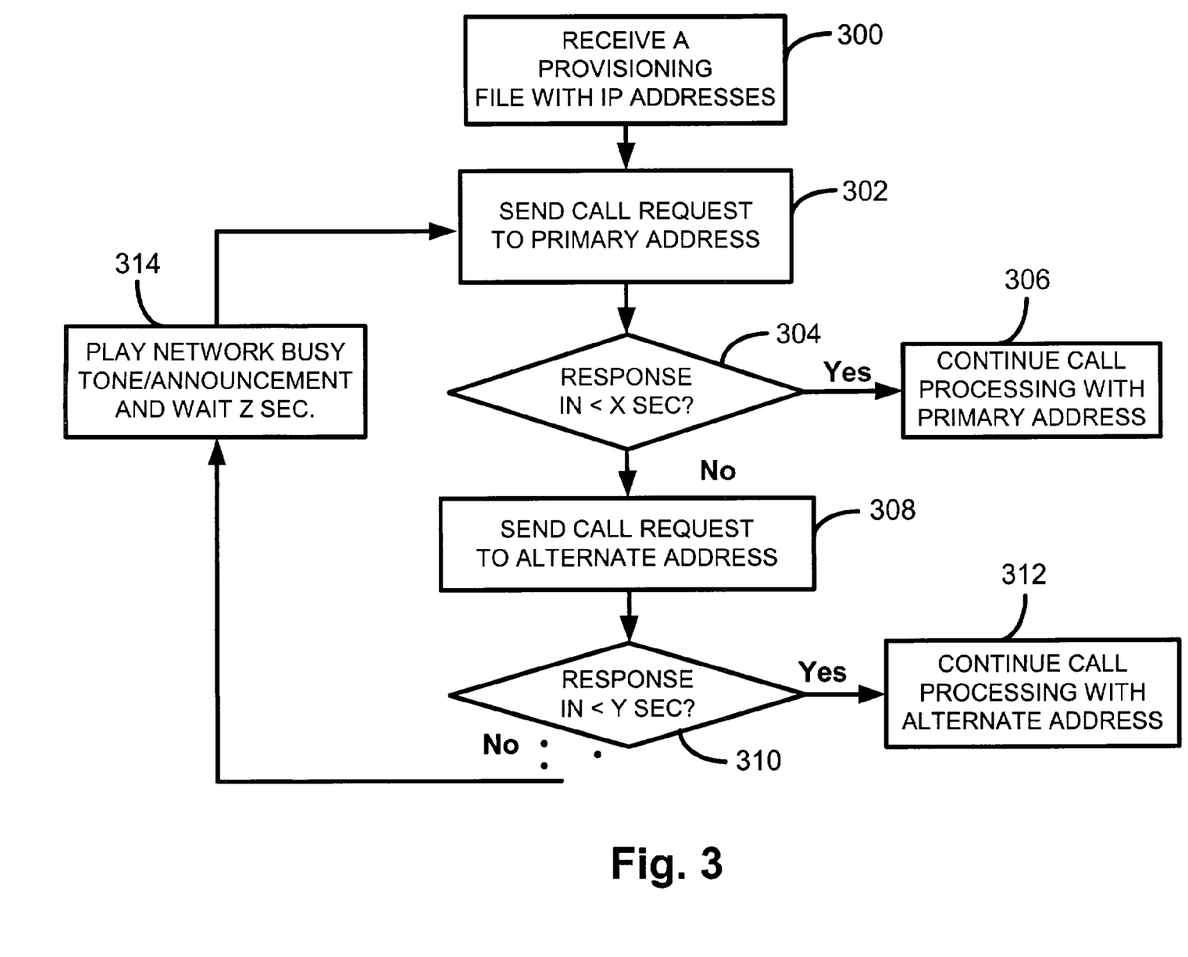
FIG. 3 displays a flow diagram implementing a user device method of the present invention.

FIG. 3 displays a flowchart implementing a method of operating a user device. A user device, such as MTA 102 attached to telephone 100, receives a provisioning file with multiple IP addresses as shown at 300. The provisioning file is communicated from the end-device configuration system 112 of FIG. 1. The provisioning file includes several IP addresses, one associated or correlated with each softswitch/proxy in the network. For example, the provisioning file will include a primary IP address for the primary softswitch/proxy 116, a secondary IP address for the alternate softswitch/proxy 118, and a number of other IP addresses for alternate softswitch/proxy "N" represented by 120. The provisioning file includes all of these IP addresses and may be stored in the MTA 102, the IP telephone 104, or in the PSTN gateway 108.

When a user device, such as the telephone 100, IP telephone 104, telephone 106, is ready to generate a call, a request is sent to the softswitch associated with the primary IP address as shown at 302. The request generates IP information, such as IP packets. The request is a call-signaling request to establish a call or continue a call on another softswitch. The packets are communicated across the IP network 110 to the primary softswitch/proxy 116. The user device, such as the MTA 102, IP telephone 104, or the PSTN gateway 108, will then wait for X number of seconds for a response as shown at 304. If there is a response, then the call will continue using the primary softswitch associated with the primary IP address as shown at 306.

If there is no response within X seconds, then the call request is sent out using an alternate IP address as shown at 308. This would require that the MTA 102, IP telephone 104, or the PSTN gateway 108 access the second IP address in the provisioning file and use the second IP address to contact the softswitch associated with the second IP address. For example, the alternate softswitch/proxy 118 would be contacted using the alternate IP address.

The MTA 102, IP telephone 104, or the PSTN gateway 108 will then wait Y seconds to see if a response is received as shown at 310. If a response is received or a call is connected in Y seconds, then call processing is continued with the alternate address as shown at 312. However, if the call is not continued in Y seconds, an algorithm may process the call by using each of the IP addresses in the provisioning file or an algorithm may process a selected number of IP addresses in the provisioning file to complete the call. In the alternative, if there is no response in Y seconds, a network announcement or a busy signal may be played a shown at 314 and the MTA 102, IP telephone 104, or the PSTN gateway 108 may wait Z seconds before initiating a call request using the primary address as shown at 302.

Many of the components of the network displayed in FIG. 1 may be implemented using a multi-function computer under the direction of computer instructions, such as computer software. For example, the centralized user-profile server 122 may be implemented with a multi-function computer. The primary softswitch/proxy 116, the alternate softswitch/proxy 118, and the alternate softswitch/proxy "N" 120 each may be implemented with a multi-function computer. The centralized CDR server 114 may be implemented with a multi-function computer. The end-device configuration system 112 may be implemented with a multi-function computer. The PSTN gateway 108 may be implemented with a multi-function computer. The MTA 102 may be implemented with a multi-function computer. The IP telephone 104 may be implemented with a multi-function computer.

Figure 4:
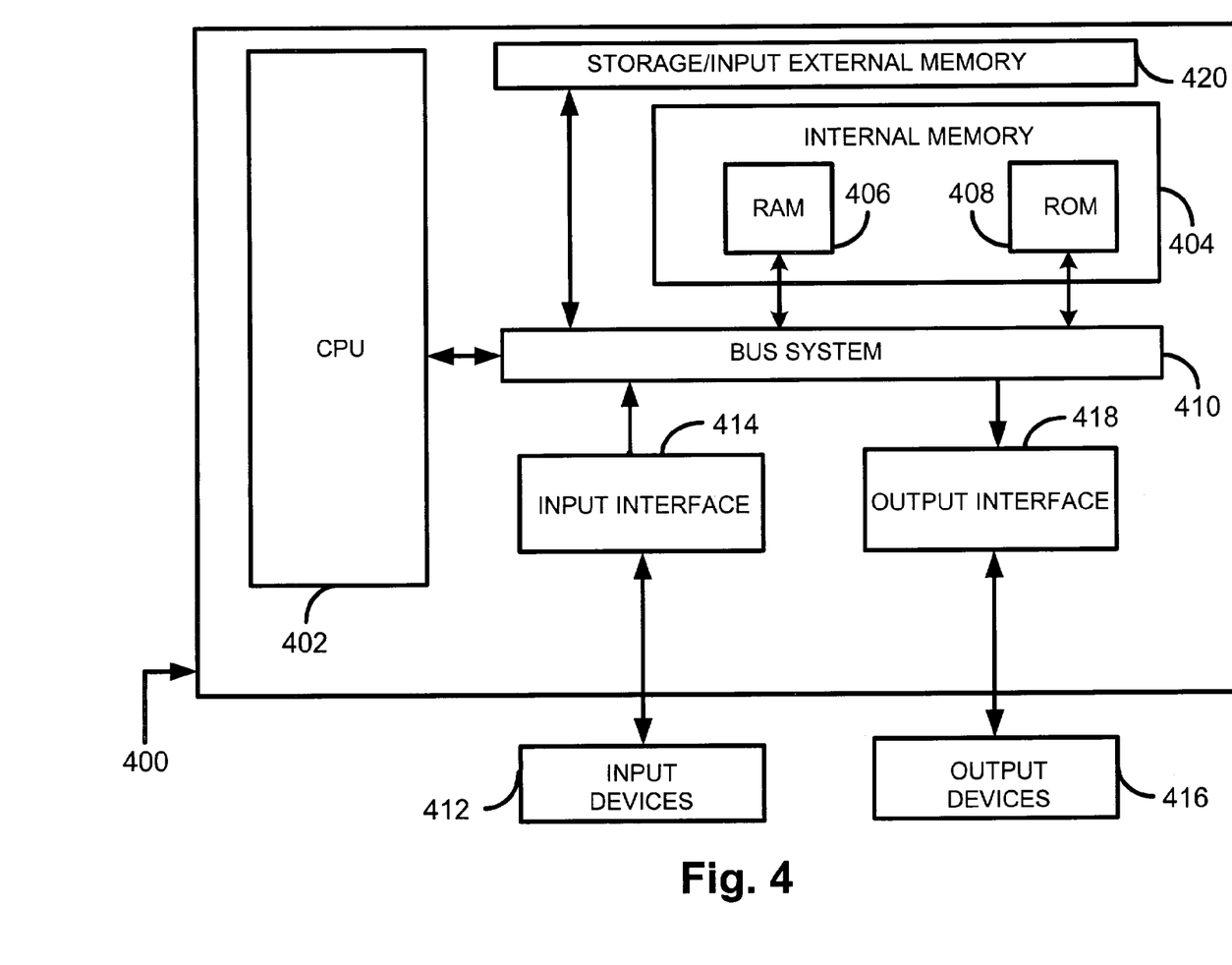
FIG. 4 displays a block diagram of a multi-function computer implementing a method and apparatus of the present invention.

FIG. 4 is a block diagram of a multi-function computer 400 implementing the components of the present invention. In FIG. 4, a central processing unit (CPU) 402 functions as the brain of the multi-function computer 400. Internal memory 404 is shown. The internal memory 404 includes short-term memory 406 and long-term memory 408. The short-term memory 406 may be Random Access Memory (RAM) or a memory cache used for staging information. The long-term memory 408 may be a Read Only Memory (ROM) or an alternative form of memory used for storing information. A bus system 410 is used by the CPU 402 to control the access and retrieval of information from short-term memory 406 and long-term memory 408. In addition, the bus system 410 may be connected to interfaces, which communicate information out of the multi-function computer 400 or receive information into the multi-function computer 400.

In one embodiment, when a user device is implemented with a multi-function computer, computer instructions implementing the method shown in FIG. 3 may be hard-coded and implemented in ROM 408. In addition, the provisioning file may be stored and accessed from RAM 406. In the alternative, both the computer instructions implementing the method shown in FIG. 3 and the provisioning file may be stored in RAM 406.

Input devices, such as tactile input device, joystick, keyboards, microphone, communications connections, or a mouse, are shown as 412. The input devices 412 interface with the system through an input interface 414. Output devices, such as a monitor, speakers, communications connections, etc., are shown as 416. The output devices 416 communicate with the computer 400 through an output interface 418.

A user device, such as 102, 104 or 108 of FIG. 1, may be implemented using the multi-function computer 400 of FIG. 4. In one embodiment of the present invention, an interface, such as the input interface 414, receives a provisioning file. The provisioning file includes a plurality of IP addresses, each associated with a softswitch. For example, the provisioning file may include a primary IP address and a secondary IP address. Computer instructions, which direct the user device, may be stored in a memory, such as ROM 408, RAM 406 or external memory 420. The computer instructions may direct the user device to make a call. The provisioning file, which includes the addresses (i.e., primary IP address and the secondary IP address), may be communicated to the user device from an end-device configuration system and stored in RAM 406, ROM 408 or external memory 420. A processor, such as CPU 402, may access the computer instructions stored in RAM 406, ROM 408 or external memory 420 and using the computer instructions generate a call request from the user device (i.e., multi-function computer 400). In doing so, the CPU 402 would access and use the primary IP address from the provisioning file to complete a call through a primary softswitch. If the call is not successful, after a predefined time, the CPU 402 may access and use the secondary IP address from the provisioning file to generate a call request to the secondary softswitch. This process continues until a call is completed. In an alternative embodiment, this process may function under control of an algorithm which manages the process for using the provisioning file. For example, every other IP address in a provisioning file may be used or a second call may be made based on a timing algorithm that includes an exponential component, etc.

The components of the method and apparatus of the present invention may be implemented in a networked configuration. When implemented in a networked configuration, the components of the present invention may be implemented in a Local Area Network or across a distributed network. For example, the centralized user-profile server 122, the centralized CDR server 114, and the end-device configuration system 112 may be implemented in a networked architecture such as a client-server architecture.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A network comprising:
a user profile server storing user profile information;
a first switch including a first Internet Protocol (IP) address in communication with the user profile server and storing first configuration data in response to the user profile information stored in the user profile server;
a second switch including a second IP address in communication with the user profile server and storing the first configuration data in response to the user profile information stored in the user profile server;
a call detail server in communication with the first switch and in communication with the second switch, the call detail server configured with call detail information in response to the first configuration information stored in the first switch and in response to the first configuration data stored in the second switch; and
a configuration system in communication with the first switch and in communication with the second switch, the configuration system provisioning the network and generating a provisioning file including the first IP address and the second IP address, wherein said first IP address is different from the second IP address.

2. The network as set forth in claim 1, further comprising, a user device receiving the provisioning file generated by the configuration system, wherein the user device is capable of generating a call in response to the first IP address and in response to the second IP address included in the provisioning file.

3. The network as set forth in claim 1, wherein the first switch and the second switch are softswitches.

4. A method of operating a network comprising the steps of:
storing user profile information;
storing first configuration data in association with a first Internet Protocol (IP) address in response to the user profile information;
storing the first configuration data in association with a second IP address in response to the user profile information;
generating call detail information in response to the first configuration data in association with the first IP address and in association with the second configuration data in association with the second IP address; and
provisioning the network and generating a configuration file including the first IP address and the second IP address, wherein said first IP address is different from the second IP address.

5. A network comprising:
means for storing user profile information;
means for storing first configuration data in association with a first Internet Protocol (IP) address in response to the user profile information;
means for storing the first configuration data in association with a second IP address in response to the user profile information stored in the user profile server;
means for generating call detail information in response to the first configuration data in association with the first IP address and in association with the second configuration data in association with the second IP address; and
means for provisioning the network using a configuration file including the first IP address and the second IP address, wherein said first IP address is different from the second IP address.

6. A user device comprising:
an interface receiving a provisioning file, the provisioning file including a first Internet Protocol (IP) address and a second IP address;
a first memory storing computer instructions;
a second memory storing the provisioning file including the first IP address and the second IP address; and
a processor coupled to the first memory and coupled to the second memory, the computer instructions causing the processor to generate a call request to the first IP address and after a predefined time causing the processor to generate a call request to the second IP address, wherein said first IP address is different from the second IP address.

7. The user device as set forth in claim 6, wherein the user device is an Internet Protocol (IP) telephone.

8. The user device as set forth in claim 6, wherein the user device is a multi-media terminal adaptor.

9. The user device as set forth in claim 6, wherein the user device is a Public Service Telephone Network gateway.

10. The user device as set forth in claim 6, wherein the first memory and the second memory are the same memory.

11. The user device as set forth in claim 6, wherein the computer instructions are hard-coded in the first memory.

12. A method of operating a user device comprising the steps of:
receiving a configuration file, the configuration file including a first Internet Protocol (IP) address and a second IP address;
storing the configuration file including the first IP address and the second IP address; and
generating a call request to the first IP address and after a predefined time generating a call request to the second IP address in response to storing the configuration file including the first IP address and the second IP address, wherein said first IP address is different from the second IP address.

13. The method of operating a user device as set forth in claim 12, wherein load balancing is initiated in response to said generating a call request to the first IP address and after a predefined time generating a call request to the second IP address.

* * * * *